United States Patent

Maderni et al.

[11] 4,046,756
[45] Sept. 6, 1977

[54] 2,5-DIHALO-4-DIALKYLSULFAMOYL 4'-(N-CYANOALKYL-N-ALKYL-AMINO)-1,1'-AZOBENZENE DISPERSE DYES

[75] Inventors: Piero Maderni; Curt Mueller, both of Binningen, Bl, Switzerland

[73] Assignee: Sandoz Ltd., Basle, Switzerland

[21] Appl. No.: 582,081

[22] Filed: May 30, 1975

Related U.S. Application Data

[63] Continuation of Ser. No. 17,916, March 9, 1970, abandoned, which is a continuation-in-part of Ser. No. 673,921, Oct. 9, 1967, abandoned.

[30] Foreign Application Priority Data

Oct. 10, 1966  Switzerland ............... 16198/66
Oct. 29, 1966  Switzerland ............... 17094/66

[51] Int. Cl.$^2$ ............................. C09B 29/08
[52] U.S. Cl. ............................................ 260/205
[58] Field of Search ............................. 260/205

[56] References Cited
U.S. PATENT DOCUMENTS 3,050,516   8/1962   Merian et al. .................. 260/205

*Primary Examiner*—Charles F. Warren
*Attorney, Agent, or Firm*—Gerald D. Sharkin; Richard E. Vila; Melvyn M. Kassenoff

[57] ABSTRACT

Dyes of the formula

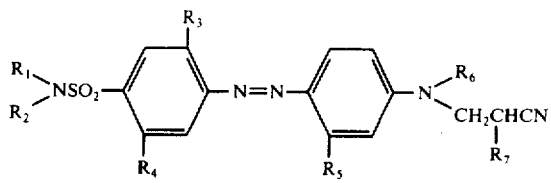

wherein each of
$R_1$, $R_2$ and $R_6$ is independently alkyl of 1 to 4 carbon atoms,
each of $R_3$ and $R_4$ is independently chloro or bromo, and
each of $R_5$ and $R_7$ is independently hydrogen or methyl, give dyeings of excellent fastness on textiles of hydrophobic synthetic and regenerated fibers made from high molecular organic materials.

4 Claims, No Drawings

2,5-DIHALO-4-DIALKYLSULFAMOYL 4'-(N-CYANOALKYL-N-ALKYL-AMINO)-1,1'-AZO-BENZENE DISPERSE DYES

This application is continuation of application Ser. No. 17,916, filed Mar. 9, 1970 and now abandoned, which, in turn, is a continuation-in-part of application Ser. No. 673,921, filed Oct. 9, 1967 and now abandoned.

This invention relates to dyes of the

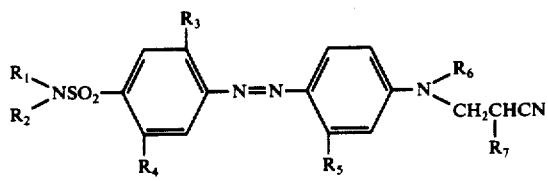

wherein each of $R_1$, $R_2$ and $R_6$, is independently alkyl of 1 to 4 carbon atoms, each of $R_3$ and $R_4$ is chloro or bromo, and each of $R_5$ and $R_7$, is independently a hydrogen atom or methyl.

These dyes are produced by diazotizing an amine of the formula

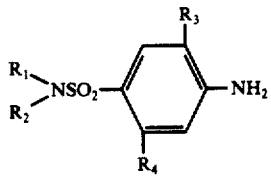

and coupling the resulting compound with a compound of the formula

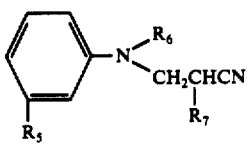

Examples of suitable amines of formula (II) are:
1-amino-2-bromo-4-diethylaminosulphonyl-5-bromobenzene,
1-amino-2-bromo-4-dipropylaminosulphonyl-5-bromobenzene,
1-amino-2-chloro-4-dipropylaminosulphonyl-5-chlorobenzene,
1-amino-2-chloro-4-dimethylaminosulphonyl-5-chlorobenzene,
1-amino-2-chloro-4-diethylaminosulphonyl-5-chlorobenzene,
1-amino-2-chloro-4-dibutylaminosulphonyl-5-chlorobenzene,
1-amino-2-bromo-4-dimethylaminosulphonyl-5-bromobenzene.

The following are examples of suitable components of formula (III)
N-ethyl-N-cyanoethylaniline
N-ethyl-N-β-cyanopropylaniline,
N-ethyl-N-cyanoethyl-m-toluidine,
N-ethyl-N-β-cyanopropyl-m-toluidine,
N-methyl-N-cyanoethylaniline,
N-propyl-N-cyanethylaniline,
N-butyl-N-cyanoethylaniline
N-butyl-N-β-cyanopropylaniline,
N-butyl-N-β-cyanopropyl-m-toluidine.

The coupling reaction is normally conducted in acid medium, buffered if necessary to about pH 4 with, e.g., an alkali metal acetate, and with cooling, preferably at 0°–5° C.

It is desirable to convert the new dyes into dyeing preparations before application, using one of the standard methods such as grinding in the presence of dispersing agents and/or fillers, with subsequent vacuum or jet drying. After the addition of an appropriate amount of water, the dye preparations can be dyed, padded or printed at long or short liquor ratio.

From aqueous dispersion the dyes build up excellently on fibres made of hydrophobic synthetic or regenerated high molecular weight organic substances.

They are particularly suitable for dyeing, padding and printing textiles of linear aromatic polyester fibres, cellulose acetate and triacetate, and polyamide fibres.

The known dyeing and printing methods may be used, e.g. the process described in French Pat. No. 1,445,371. The dyeings obtained are of orange to scarlet shade and have very good all-round fastness; they are outstandingly fast to thermofixation, sublimation, pleating, rubbing, dry cleaning, ozone and burnt gas fumes, and very fast to wet tests, such as water, washing and perspiration. Their light fastness and the reserve of wool and cotton are other notable features. The dyes are highly stable to the various forms of permanent press finishing. They are resistant to hydrolytic and reducing effects at temperatures up to about 220° C and particularly up to 140° C and are stable to acids and alkalis within a wide range. These stability properties are not adversely affected by the liquor ratio or the presence of dyeing accelerants.

The dyes of the present invention have better exhaustion and build-up properties and better wash fastness on cellulose triacetate and polyamide fibres than the dyes disclosed in U.S. Pat. No. 3,050,516.

In the Examples the part and percentages are by weight and the temperatures in degrees centigrade.

EXAMPLE 1

To 155 parts of sulphuric acid are added at 70° 7 parts of sodium nitrite, followed at 15°–20° by 100 parts of glacial acetic acid and 26.9 parts of 1-amino-2,5-dichlorobenzene-4-sulphonic acid dimethylamide. After 2 hours the resulting diazonium salt solution is run into 100 parts of water and 400 parts of ice. The excess sodium nitrite is decomposed by adding 5 parts of aminosulphonic acid, after which the solution is filtered clear. A solution of 17.4 parts of N-ethyl-N-cyanoethylaniline in 50 parts of glacial acetic acid is allowed to flow into the filtrate. The coupling reaction is completed by adjustment with sodium acetate; then the dye is filtered off, washed free of acid and dried. On recrystallization from alcohol-dioxane it settles out in the pure form. It dyes polyester fibres in orange shades with good all-round fastness.

EXAMPLE 2

26.9 Parts of 1-amino-2,5-dichlorobenzene-4-sulphonic acid dimethylamide in finely pulverized form are entered into 56 parts of water containing 0.5 parts of caustic soda 30% and stirred for one hour, after which time 50 parts of hydrochloric acid 30%, 45 parts of glacial acetic acid and 27 parts of ice are added. At −5° to +5° C 30 ml. 4 N. sodium nitrite solution are dropped slowly into the solution. After 3 hours the excess sodium nitrite is destroyed by adding aminosulphonic acid and the solution filtered clear. A solution of 18.8 parts of N-ethyl-N-β-cyanopropylaniline in 50 parts of glacial acetic acid is run into the filtrate. After 2 hours the coupling reaction is complete and the dye is filtered off, washed free of acid and dried. It can be recrystallized from alcohol-dioxane. This dye gives orange dyeings of good fastness on polyester fibres.

Dyeing Method

A mixture of 7 parts of the dye obtained as detailed in Example 1, 4 parts of sodium dinaphthylmethanedisulphonate, 4 parts of sodium cetyl sulphate and 5 parts of anhydrous sodium sulphate is ground in a ball mill for 48 hours to give a fine powder. One part of the powder is dispersed in 3000 parts of water containing 3 parts of a 30% solution of a highly sulphonated castor oil and 20 parts of an emulsion of a chlorinated benzene. Into this bath 100 parts of a polyester fabric are entered at 20°-25°. The bath is raised to 95°-100° in about 30 minutes and the fabric dyed for 1 hour at this temperature. It is removed, rinsed, soaped for 15 minutes at 70° with a 0.1% solution of an alkylphenylpolyglycol ether, rinsed again and dried. An orange dyeing with excellent fastness properties is obtained.

In the following table are additional dyes of formula (I) which are produced in accordance with the procedure of Example 1.

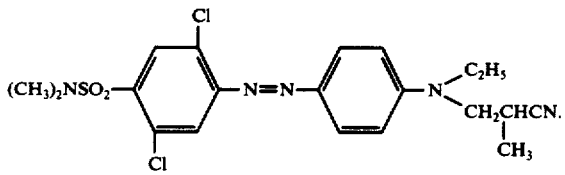

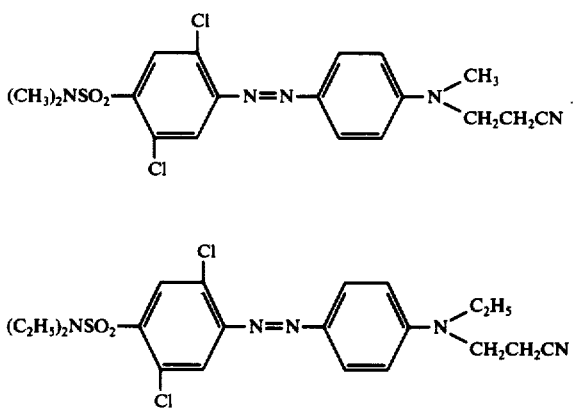

| Exple No. | $R_1$ | $R_2$ | $R_3$ | $R_4$ | $R_5$ | $R_6$ | $R_7$ | Shade on Polyester fiber |
|---|---|---|---|---|---|---|---|---|
| 3 | —CH₃ | —CH₃ | —Cl | —Cl | —H | —CH₃ | —H | orange |
| 4 | ″ | ″ | ″ | ″ | ″ | —C₃H₇ | ″ | ″ |
| 5 | ″ | ″ | ″ | ″ | ″ | —C₄H₉ | ″ | ″ |
| 6 | —C₂H₅ | —C₂H₅ | ″ | ″ | ″ | ″ | ″ | ″ |
| 7 | ″ | ″ | ″ | ″ | ″ | —C₂H₅ | ″ | ″ |
| 8 | ″ | ″ | —Br | —Br | ″ | ″ | ″ | ″ |
| 9 | ″ | ″ | ″ | ″ | ″ | —CH₃ | ″ | ″ |
| 10 | ″ | ″ | ″ | ″ | —CH₃ | —C₂H₅ | ″ | scarlet |
| 11 | —CH₃ | —CH₃ | ″ | ″ | H | ″ | ″ | orange |
| 12 | ″ | ″ | —Cl | —Cl | ″ | ″ | —CH₃ | ″ |
| 13 | ″ | ″ | —Br | —Br | ″ | ″ | ″ | ″ |
| 14 | ″ | ″ | ″ | ″ | ″ | —CH₃ | —H | ″ |
| 15 | ″ | ″ | ″ | ″ | ″ | —C₃H₇ | ″ | ″ |
| 16 | ″ | ″ | ″ | ″ | ″ | —C₄H₉ | ″ | ″ |
| 17 | ″ | ″ | —Cl | —Cl | ″ | —CH₃ | —CH₃ | ″ |
| 18 | ″ | ″ | ″ | ″ | ″ | —C₃H₇ | ″ | ″ |
| 19 | ″ | ″ | ″ | ″ | ″ | —C₄H₉ | ″ | ″ |
| 20 | ″ | ″ | —Br | —Br | ″ | —CH₃ | ″ | ″ |
| 21 | ″ | ″ | ″ | ″ | ″ | —C₂H₅ | ″ | ″ |
| 22 | ″ | ″ | ″ | ″ | ″ | —C₃H₇ | ″ | ″ |
| 23 | ″ | ″ | ″ | ″ | ″ | —C₄H₉ | ″ | ″ |
| 24 | ″ | ″ | —Cl | —Cl | —CH₃ | —CH₃ | ″ | scarlet |
| 25 | ″ | ″ | ″ | ″ | ″ | —C₂H₅ | ″ | ″ |
| 26 | ″ | ″ | ″ | ″ | ″ | —C₃H₇ | ″ | ″ |
| 27 | ″ | ″ | ″ | ″ | ″ | —CH₃ | —H | ″ |
| 28 | —CH₃ | —CH₃ | —Cl | —Cl | —CH₃ | —C₂H₅ | —H | ″ |
| 29 | ″ | ″ | ″ | ″ | ″ | —C₃H₇ | ″ | ″ |
| 30 | ″ | ″ | ″ | ″ | ″ | —C₄H₉ | ″ | ″ |
| 31 | —C₃H₇ | —C₃H₇ | ″ | ″ | H | —CH₃ | ″ | orange |
| 32 | —C₄H₉ | —C₄H₉ | ″ | ″ | ″ | —C₂H₅ | ″ | ″ |
| 33 | —C₃H₇ | —C₃H₇ | —Br | —Br | ″ | ″ | ″ | ″ |
| 34 | ″ | ″ | ″ | ″ | ″ | —CH₃ | ″ | ″ |
| 35 | —C₄H₉ | —C₄H₉ | ″ | ″ | ″ | ″ | ″ | ″ |
| 36 | ″ | ″ | ″ | ″ | ″ | ″ | —CH₃ | ″ |
| 37 | —C₂H₅ | —C₂H₅ | Cl | Cl | ″ | —C₂H₅ | ″ | ″ |

Representative dyestuffs of the foregoing Examples are as follows:

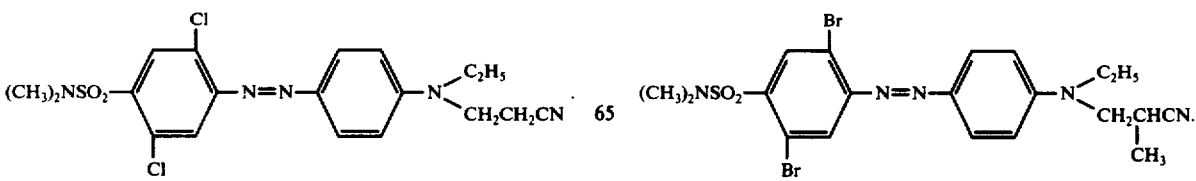

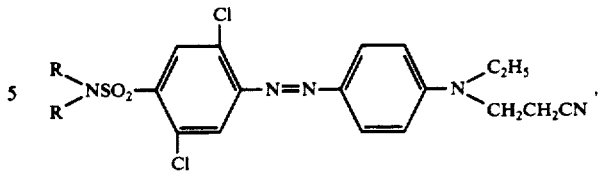
wherein each R is independently methyl or ethyl.
2. A compound according to claim 1 wherein each R is methyl or ethyl.
3. The compound according to claim 2 having the formula
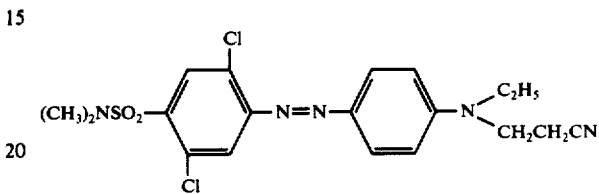
4. The compound according to claim 2 having the formula
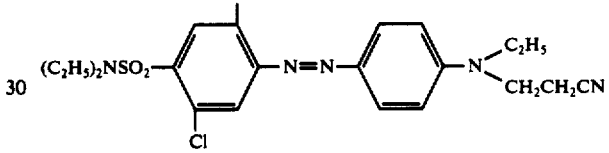
* * * * *
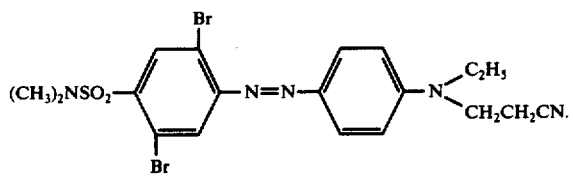
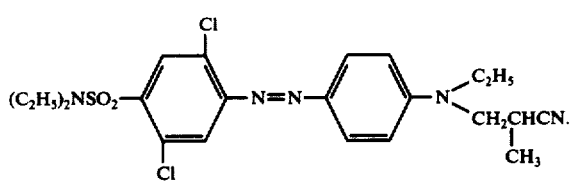
Having thus disclosed the invention what we claim is:
1. A compound of the formula